US011998776B2

(12) United States Patent
Liao et al.

(10) Patent No.: US 11,998,776 B2
(45) Date of Patent: Jun. 4, 2024

(54) ROPE BASED FALL PROTECTION DEVICE

(71) Applicant: YOKE INDUSTRIAL CORP., Taichung (TW)

(72) Inventors: Wen-Ming Liao, Taichung (TW); Wei-Chih Chen, Chiayi (TW)

(73) Assignee: YOKE INDUSTRIAL CORP., Taichung (TW)

( * ) Notice: Subject to any disclaimer, the term of this patent is extended or adjusted under 35 U.S.C. 154(b) by 437 days.

(21) Appl. No.: 16/567,463

(22) Filed: Sep. 11, 2019

(65) Prior Publication Data

US 2020/0406073 A1 Dec. 31, 2020

(30) Foreign Application Priority Data

Jun. 25, 2019 (TW) ................................ 108122170

(51) Int. Cl.
*A62B 35/00* (2006.01)
*E04G 21/32* (2006.01)
*B65H 75/34* (2006.01)

(52) U.S. Cl.
CPC ........ *A62B 35/0075* (2013.01); *A62B 35/005* (2013.01); *A62B 35/0068* (2013.01);
(Continued)

(58) Field of Classification Search
CPC .............. A63B 35/0075; A63B 35/005; A63B 35/0068; A63B 35/0093; A63B 1/10; B65H 75/34; B65H 2403/00; E04G 21/3204
See application file for complete search history.

(56) References Cited

U.S. PATENT DOCUMENTS 1,767,938 A * 6/1930 Monnier .................. B66D 1/34 242/586.1
3,156,764 A * 11/1964 Toedtman .............. H01R 4/186 174/94 R (Continued)

FOREIGN PATENT DOCUMENTS

CN 2636892 9/2004
FR 2883854 A1 * 10/2006 ......... B65H 75/4431

(Continued)

OTHER PUBLICATIONS

Examination report for TW108122170, issued on Dec. 7, 2019, Total of 3 pages.

(Continued)

*Primary Examiner* — Daniel P Cahn
*Assistant Examiner* — Shiref M Mekhaeil
(74) *Attorney, Agent, or Firm* — Apex Juris, pllc; R. Lynette Wylie

(57) ABSTRACT

A rope based fall protection device including a rotation unit, a brake unit, and a rope. A first end of the rope is connected to the rotation unit. The rope includes a first rope loop and a second rope loop that are wound around the rotation unit. A first retaining portion of a retaining ring is sleeved on the first rope loop and a second retaining portion thereof is sleeved on the second rope loop, such that the rope forms a rope section which has a fixed length between the second retaining portion and the first end and is wound around the rotation unit. When a free end of the rope is pulled by an external force to release the rope wound around the rotation unit in a direction away from the rotation unit, the retaining ring is broken to release the rope section of the rope. The external force is greater than or equal to a pulling force generated by a user's free fall. By releasing the rope section of the rope, the rotation unit rotates and simultaneously (Continued)

drives the brake unit to rotate to slow down or stop the rotation of the rotation unit.

11 Claims, 8 Drawing Sheets

(52) U.S. Cl.
CPC .......... *E04G 21/3204* (2013.01); *B65H 75/34* (2013.01); *B65H 2403/00* (2013.01)

(56) References Cited

U.S. PATENT DOCUMENTS

| | | | | | |
|---|---|---|---|---|---|
| 3,221,383 | A * | 12/1965 | Bilodeau | F16G 11/02 | 24/130 |
| 3,322,888 | A * | 5/1967 | Zemels | H01R 4/186 | D13/149 |
| 3,903,574 | A * | 9/1975 | Fraioli | F16G 11/02 | 403/399 |
| 4,295,749 | A * | 10/1981 | McBride | F16G 11/048 | 403/211 |
| 4,846,313 | A * | 7/1989 | Sharp | A62B 35/0093 | 242/396.5 |
| 5,141,178 | A * | 8/1992 | Alden | B64D 39/02 | 242/483 |
| 5,200,576 | A * | 4/1993 | Schrader | H01R 4/186 | 403/275 |
| 5,312,061 | A * | 5/1994 | McCormick | B65H 75/28 | 242/586.2 |
| 5,351,367 | A * | 10/1994 | Kennedy | B60P 7/0823 | 24/129 R |
| 5,351,906 | A * | 10/1994 | Feathers | A62B 1/10 | 242/396.6 |
| 5,447,280 | A * | 9/1995 | Feathers | A62B 1/10 | 242/396.6 |
| 6,732,983 | B1 * | 5/2004 | Blake | F16L 3/1236 | 248/74.2 |
| 6,846,989 | B2 * | 1/2005 | Sokol | H01R 4/186 | 174/94 R |
| 6,981,670 | B2 * | 1/2006 | Harrington | B65H 75/4426 | 242/402 |
| 7,108,248 | B2 * | 9/2006 | Winter | B66D 1/34 | 242/579 |
| 7,183,489 | B2 * | 2/2007 | Kossak | H01R 4/186 | 439/877 |
| 8,079,570 | B2 * | 12/2011 | Ruan | B66D 3/14 | 254/371 |
| 8,245,817 | B2 * | 8/2012 | Casebolt | A62B 1/10 | 182/75 |
| 8,469,149 | B2 * | 6/2013 | Meillet | B66D 1/54 | 242/378.2 |
| 8,579,239 | B2 * | 11/2013 | Lothamer | B60R 16/0215 | 248/69 |
| 9,121,462 | B2 * | 9/2015 | Casebolt | A62B 35/0093 | |
| 9,828,724 | B2 * | 11/2017 | Kindstrand | D07B 1/18 | |
| 10,221,523 | B2 * | 3/2019 | Kindstrand | D07B 1/18 | |
| 10,883,568 | B1 * | 1/2021 | Despain | E04H 15/64 | |
| 10,985,474 | B2 * | 4/2021 | Osenga | H01R 4/643 | |
| 2002/0104918 | A1 * | 8/2002 | Zacharias | B66D 1/34 | 242/587.1 |
| 2004/0031644 | A1 * | 2/2004 | Kurtgis | A62B 35/0075 | 182/3 |
| 2008/0041661 | A1 * | 2/2008 | Meillet | A62B 35/0056 | 182/13 |
| 2009/0084631 | A1 * | 4/2009 | Casebolt | A62B 1/10 | 182/235 |
| 2011/0240403 | A1 * | 10/2011 | Meillet | F16G 11/025 | 29/402.08 |
| 2012/0298446 | A1 * | 11/2012 | Meillet | A62B 35/0056 | 182/15 |
| 2015/0233446 | A1 * | 8/2015 | Disantis | F16G 11/02 | 24/129 R |
| 2017/0361136 | A1 * | 12/2017 | Wu | A62B 35/0093 | |

FOREIGN PATENT DOCUMENTS

| | | |
|---|---|---|
| TW | M381412 U | 6/2010 |
| TW | M450390 | 4/2013 |
| TW | M572765 | 1/2019 |
| TW | 201907981 A | 3/2019 |
| TW | M586154 U | 11/2019 |
| WO | 2011143202 A2 | 11/2011 |

OTHER PUBLICATIONS

Search report for TW108122170, issued on Dec. 7, 2019, Total of 1 page.
English abstract for CN2636892, total of 1 page.
English abstract for TW201907981, total of 1 page.
English abstract for TWM381412, total of 1 page.
English abstract for TWM450390, total of 1 page.
English abstract for TWM572765, total of 1 page.
English abstract for TWM586154, total of 1 page.
Extended European search report for EP19202495.8, Issued on Apr. 2, 2020.

* cited by examiner

ROPE BASED FALL PROTECTION DEVICE

BACKGROUND OF THE INVENTION

Technical Field

The present invention is related to a fall protection device, and more particularly related to a rope based fall protection device which is adapted for operators working aloft.

Description of Related Art

In recent years, labor safety has gradually received attention. When working aloft, for instance, a worker is required to wear a fall protection device that includes a safety belt. The fall protection device is secured to a support, one end of the safety belt is secured to the fall protection device, and the other end of the safety belt is fastened to the worker. If the worker accidentally falls from heights, it ensures the worker's safety by preventing the worker from keeping falling or by slowing down the worker's falling speed.

A conventional rope based fall protection device includes a rotation unit, a volute spring, a brake unit, and a rope. The brake unit is connected to the rotation unit for restricting the rotation of the rotation unit. An end of the rope is connected to the rotation unit and wound around the rotation unit, while the other end thereof is fastened to a worker. An inner end of the volute spring is connected to the rotation unit to retract the rope for keeping the rope being wound around the rotation unit. When the worker moves at heights, the rope is pulled and released from the rotation unit, and simultaneously drives the volute spring, the brake unit and the rotation unit to rotate coaxially. If the worker accidentally falls from heights, the brake unit can immediately lock the rotation unit to slow down the rotation so as to prevent the rope from releasing from the rotation unit and stop the worker falling quickly.

However, when the worker moves at heights, the rope may have been completely released by the rotation unit. If the worker inadvertently falls at that time, the brake unit cannot be driven by the rope to slow down the rotation of the rotation unit. Although the other end of the conventional rope based fall protection device is tightly fastened to the worker, the worker is likely to be injured by the short free fall and the pulling force caused by the rope.

Therefore, the conventional rope based fall protection device still has the problem to be solved and room for improvement.

BRIEF SUMMARY OF THE INVENTION

In view of the above, an objective of the present invention is to provide a rope based fall protection device which prevents a rope from completely releasing from a rotation unit when a worker moves at heights. If the worker inadvertently falls, a brake unit can be driven by an unreleased rope to slow down the rotation of the rotation unit, thereby preventing the worker from being injured by the short free fall and the pulling force caused by the rope.

To achieve the object mentioned above, the present invention provides a rope based fall protection device including a rotation unit, a brake unit, and a rope. The rope is wound around the rotation unit, and the brake unit is connected to the rotation unit and configured to restrict the rotation of the rotation unit. A first end of the rope is connected to the rotation unit, the first end of the rope rotates as the rotation unit rotates so that the rope is wound around the rotation unit, and a second end of the rope is a free end.

The rope from the first end to the second end at least sequentially includes a plurality of third rope loops, a first rope loop, and a second rope loop that are wound around the rotation unit. The first rope loop is between the plurality of the third rope loops and the second rope loop. And, a retaining ring includes a first retaining portion and a second retaining portion adjacent to each other. The first retaining portion is sleeved on the first rope loop and the second retaining portion is sleeved on the second rope loop, such that the rope forms a rope section which has a fixed length between the second retaining portion and the first end and is wound around the rotation unit. When the free end of the rope is pulled by an external force to release the rope wound around the rotation unit in a direction away from the rotation unit, the retaining ring is broken to release the rope section of the rope. By releasing the rope section of the rope, the rotation unit rotates and simultaneously drives the brake unit to rotate. The external force is greater than or equal to a pulling force generated by a user's free fall.

An advantage of the present invention is that the rope forms the rope section which has the fixed length between the second retaining portion and the first end and is wound around the rotation unit. If the worker falls accidentally from heights, the free end of the rope fastened to the worker is pulled by the external force, the retaining ring is broken due to the external force and the rope section of the rope is released. By releasing the rope section of the rope, the rotation unit rotates and simultaneously drives the brake unit to rotate so as to slow down the rotation of the rotation unit and prevent the worker from being injured by the short free fall and the pulling force caused by the rope.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

The following illustrative embodiments and drawings are provided to illustrate the disclosure of the present invention, these and other advantages and effects can be clearly understood by persons skilled in the art after reading the disclosure of this specification.

Figure 1:
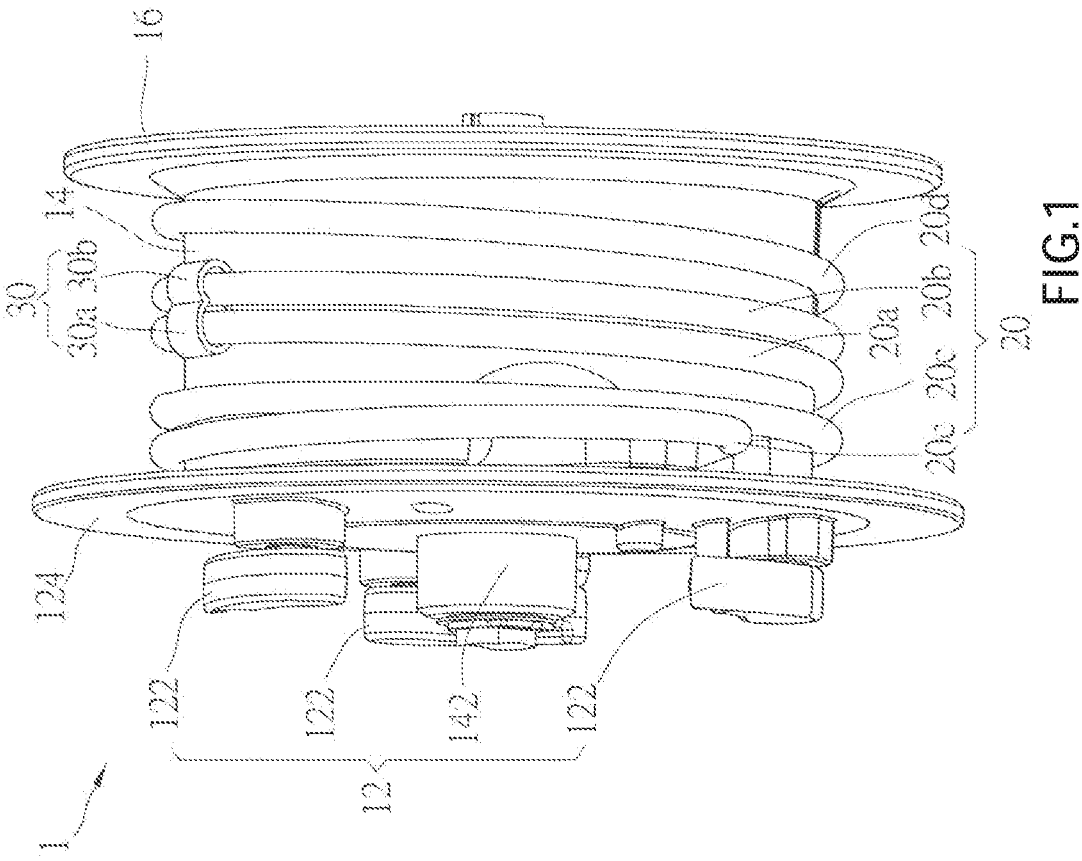
FIG. 1 is a perspective view of a rotation disc of a fall protection device of a preferred embodiment according to the present invention.

As illustrated in FIG. 1, a rope based fall protection device 1 of a preferred embodiment according to the present invention for preventing a worker from inadvertently falling from heights or for slowing down the falling speed of the worker. The rope based fall protection device 1 includes a rotation unit 14, a brake unit 12, a rope 20 and a retaining ring 30. The rope 20 is wound around the rotation unit 14, the retaining ring 30 is sleeved on the rope 20, and the brake unit 12 is connected to the rotation unit 14 to restrict the rotation of the rotation unit 14.

A first end of the rope 20 is connected to the rotation unit 14, and the first end of the rope 20 rotates as the rotation unit 14 rotates so that the rope 20 is wound around the rotation unit 14. A second end of the rope 20 is a free end.

As illustrated in FIG. 1, the rope 20 from the first end to the second end at least sequentially includes a plurality of third rope loops 20*c*, a first rope loop 20*a*, a second rope loop 20*b* and at least a fourth rope loop 20*d* that are wound around the rotation unit 14. The retaining ring 30 includes a first retaining portion 30*a* and a second retaining portion 30*b* adjacent to each other. The first retaining portion 30*a* is sleeved on the first rope loop 20*a* and the second retaining portion 30*b* is sleeved on the second rope loop 20*b*, such that the rope 20 forms a rope section which has a fixed length between the second retaining portion 30*b* and the first end and is wound around the rotation unit 14. In FIG. 1 and FIG. 2, the third rope loop 20*c* is merely an example showing two rope loops wound around the rotation unit 14, but not limited thereto. In practice, the winding number of the third rope loop 20*c* of the rope 20 on the rotation unit 14 can be adjusted as needed.

It is worth mentioning that the rotation unit 14 of the rope based fall protection device 1 can be driven by a retracting force in a state of not being pulled by an external force, so that the rope 20 keeps retracted on the rotation unit 14. In practice, the rotation unit 14 can be connected to a volute spring (not shown in figure). The retracting force is provided by the volute spring and drives the rotation unit 14 to rotate, so that the rope 20 keeps retracted on the rotation unit 14. As illustrated in FIG. 1, one end of the rotation unit 14 is secured to the brake unit 12 while the other end thereof is secured to a cover plate 16. In an embodiment, an inner end of the volute spring can be secured to the cover plate 16. When the free end of the rope 20 is pulled by the external force to release the rope 20 on the rotation unit 14 in a direction away from the rotation unit 14, the rope 20 drives the rotation unit 14 to rotate and have the volute spring accumulating the retracting force. On the contrary, when the external force of the rope 20 is removed, the retracting force accumulated by the volute spring drives the rotation unit 14 to rotate to have the rope 20 retracted on the rotation 14.

Figure 2A:
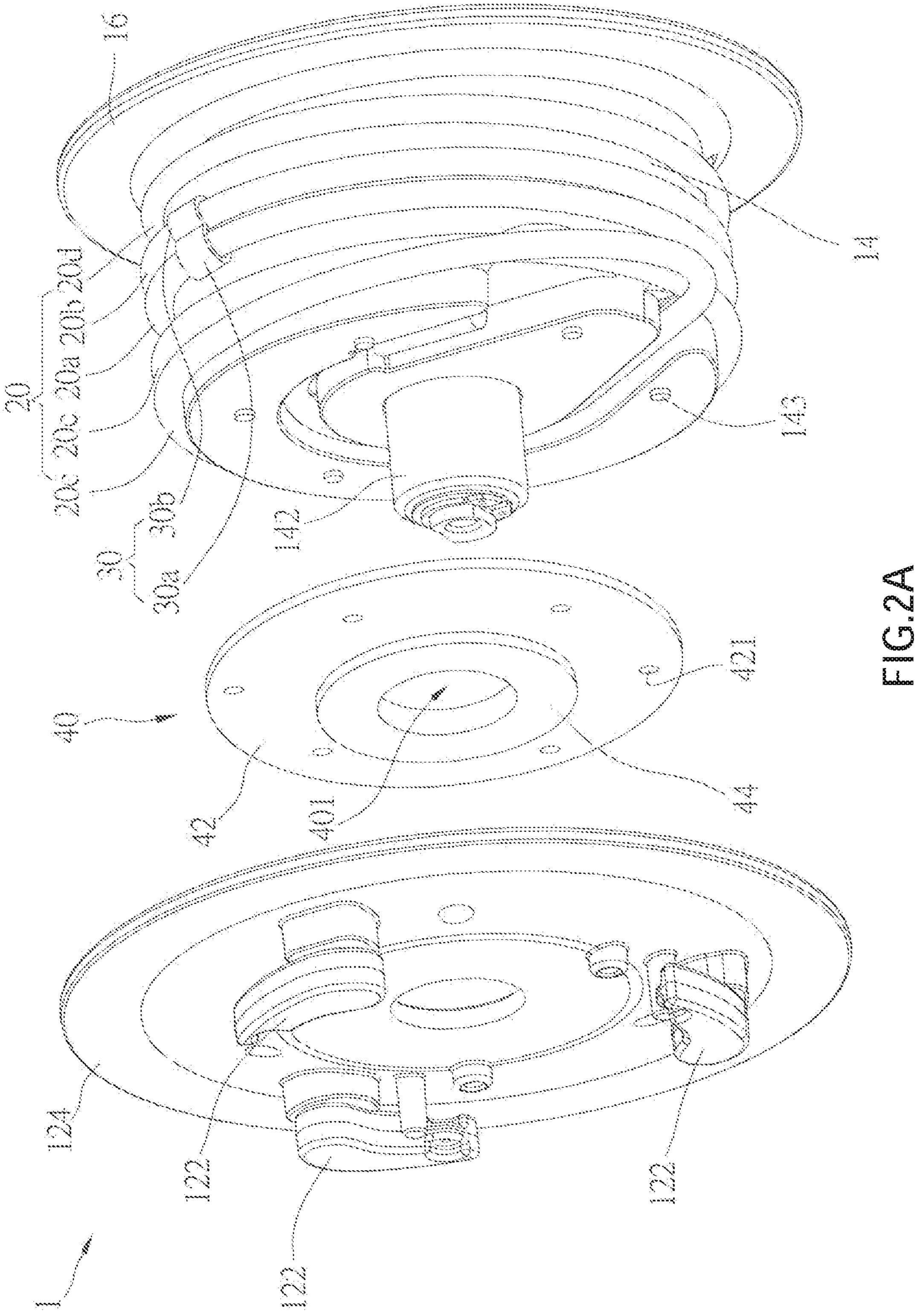
FIG. 2A is an exploded view of the rotation disc of the fall protection device of the preferred embodiment.

In the current embodiment, the free end of the rope 20 is fastened to a user (such as a worker at heights). In a normal moving condition, the rope 20 forms the rope section which has the fixed length between the second retaining portion 30*b* of the retaining ring 30 and the first end of the rotation unit 14 and is wound around the rotation unit 14. That is, between the second retaining portion 30*b* and the first end, the rope section of the rope 20 keeps wound around the rotation unit 14 and not released from the rotation unit 14 under normal use. In other words, the third rope loops 20*c*, the first rope loop 20*a*, and the second rope loop 20*b* keep wound around the rotation unit 14 but not released from the rotation unit 14 under normal use. The rope 20 between the second retaining portion 30*b* of the retaining ring 30 and the second end fastened to the user can be released from the rotation unit 14 as the user moves; that is, the fourth rope loop 20*d* wound around the rotation unit 14 is freely released from the rotation unit 14 as the user moves. In FIG. 1 and FIG. 2A, the fourth rope loop 20*d* is merely an example showing one rope loop wound around the rotation unit 14, but not limited thereto. In practice, the winding number of the fourth rope loop 20*d* of the rope 20 on the rotation unit 14 can be adjusted as needed.

When the free end of the rope 20 is pulled by a strong external force and then the rope 20 wound around the rotation unit 14 is released in a direction away from the rotation unit 14, the retaining ring 30 is broken to release the rope section of the rope 20. By releasing the rope section of the rope 20, the rotation unit 14 rotates and simultaneously drives the brake unit 12 to rotate so as to slow down the rotation speed of the rotation unit 14. In the current embodiment, the strong external force is greater than or equal to a pulling force generated by a user's free fall.

In the current embodiment, when the retaining ring 30 is broken, the first retaining portion 30*a* and the second retaining portion 30*b* of the retaining ring 30 are separated from each other to release the rope section of the rope, so that the rotation unit 14 rotates and simultaneously drives the brake unit 12 to rotate.

In another embodiment, when the retaining ring 30 is broken, at least one of the first retaining portion 30*a* and the second retaining portion 30*b* of the retaining ring 30 is broken, causing the rope 20 disengaged from at least one of the first retaining portion 30*a* and the second retaining portion 30*b* to release the rope section of the rope 20, so that the rotation unit 14 rotates and simultaneously drives the brake unit 12 to rotate. For example, when the retaining ring 30 is broken, the first retaining portion 30*a* of the retaining ring 30 is broken, causing the rope 20 disengaged from the first retaining portion 30*a*; alternatively, when the retaining ring 30 is broken, the second retaining portion 30*b* of the retaining ring 30 is broken, causing the rope 20 disengaged from the second retaining portion 30*b*; or, when the retaining ring 30 is broken, the first retaining portion 30*a* and the second retaining portion 30*b* of the retaining ring 30 are broken, causing the rope 20 disengaged from the first retaining portion 30*a* and the second retaining portion 30*b*.

In another embodiment of the present invention, at least one of the first retaining portion 30*a* and the second retaining portion 30*b* of the retaining ring 30 has a slit (not shown in figures). When the retaining ring 30 is broken, the rope 20 is disengaged from at least one of the first retaining portion 30*a* and the second retaining portion 30*b* through the slit to release the rope section of the rope 20, so that the rotation unit 14 rotates and simultaneously drives the brake unit 12 to rotate. For example, when the first retaining portion 30*a* has the slit and the retaining ring 30 is broken, the rope 20 is disengaged from the first retaining portion 30*a* through the slit; alternatively, when the second retaining portion 30*b* has the slit and the retaining ring 30 is broken, the rope 20 is disengaged from the second retaining portion 30*b* through the slit; or, when the retaining ring 30 has two slits located respectively in the first retaining portion 30*a* and the second retaining portion 30*b* and the retaining ring 30 is broken, the rope 20 is disengaged through the two slits from the first retaining portion 30*a* and the second retaining portion 30*b*.

Figure 2B:
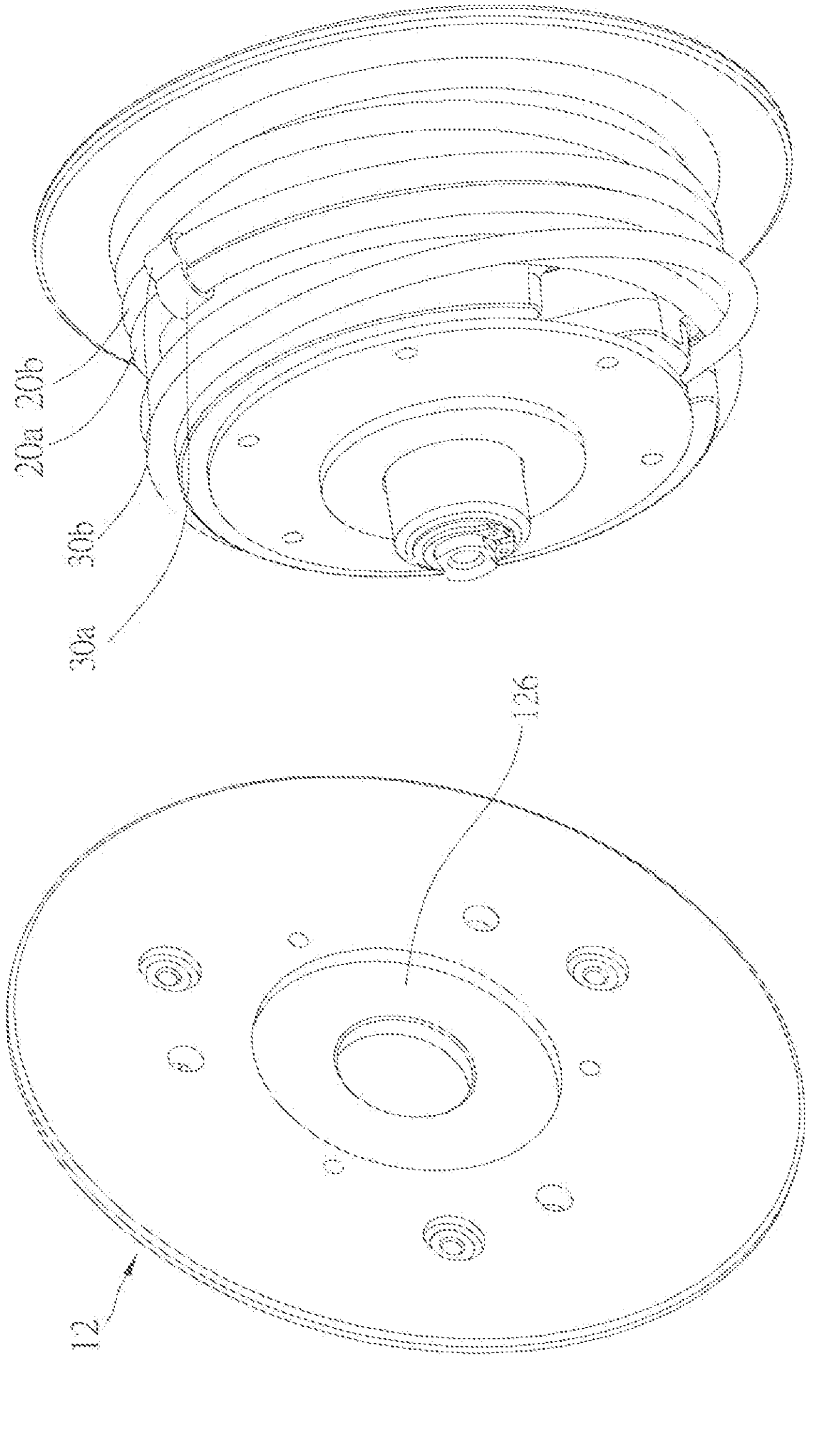
FIG. 2B is another exploded view of the rotation disc of the fall protection device of the preferred embodiment.

As illustrated in FIG. 1, FIG. 2A, and FIG. 2B, the rotation unit 14 has a shaft 142 passing through an axial hole in the center of a block plate 124 of the brake unit 12. The brake unit 12 and the rotation unit 14 are connected to each other through a fixed member (not shown in figures), so that the brake unit 12 and the rotation unit 14 are fixed and cannot be separated from each other.

In FIG. 2A and FIG. 2B, a friction plate 40 is disposed between the brake unit 12 and the rotation unit 14. The friction plate 40 has an axial hole 401 so the shaft 142 of the rotation unit 14 passes through the axial hole 401 of the friction plate 40. The friction plate 40 further has a fixed member 42 and a friction pad 44. The fixed member 42 of the friction plate 40 is disposed at an end face of the rotation unit 14 toward the brake unit 12 and contacts the end face. The end face of the rotation unit 14 toward the brake unit 12 has a plurality of positioning bumps 143 respectively passing through a plurality of positioning holes 421 of the fixed member 42. When the rotation unit 14 rotates, the friction plate 40 is driven by the rotation unit 14 to rotate synchronously in the same direction.

The brake unit 12 includes three brake member 122 symmetrically disposed on the block plate 124 and includes a friction surface 126 located on the other side of the block plate 124 opposite the brake members 122. In the current embodiment, the friction pad 44 which is between the fixed member 42 and the friction surface 126 of the brake unit 12 is in close contact with the friction surface 126 of the brake unit 12.

Figure 4:
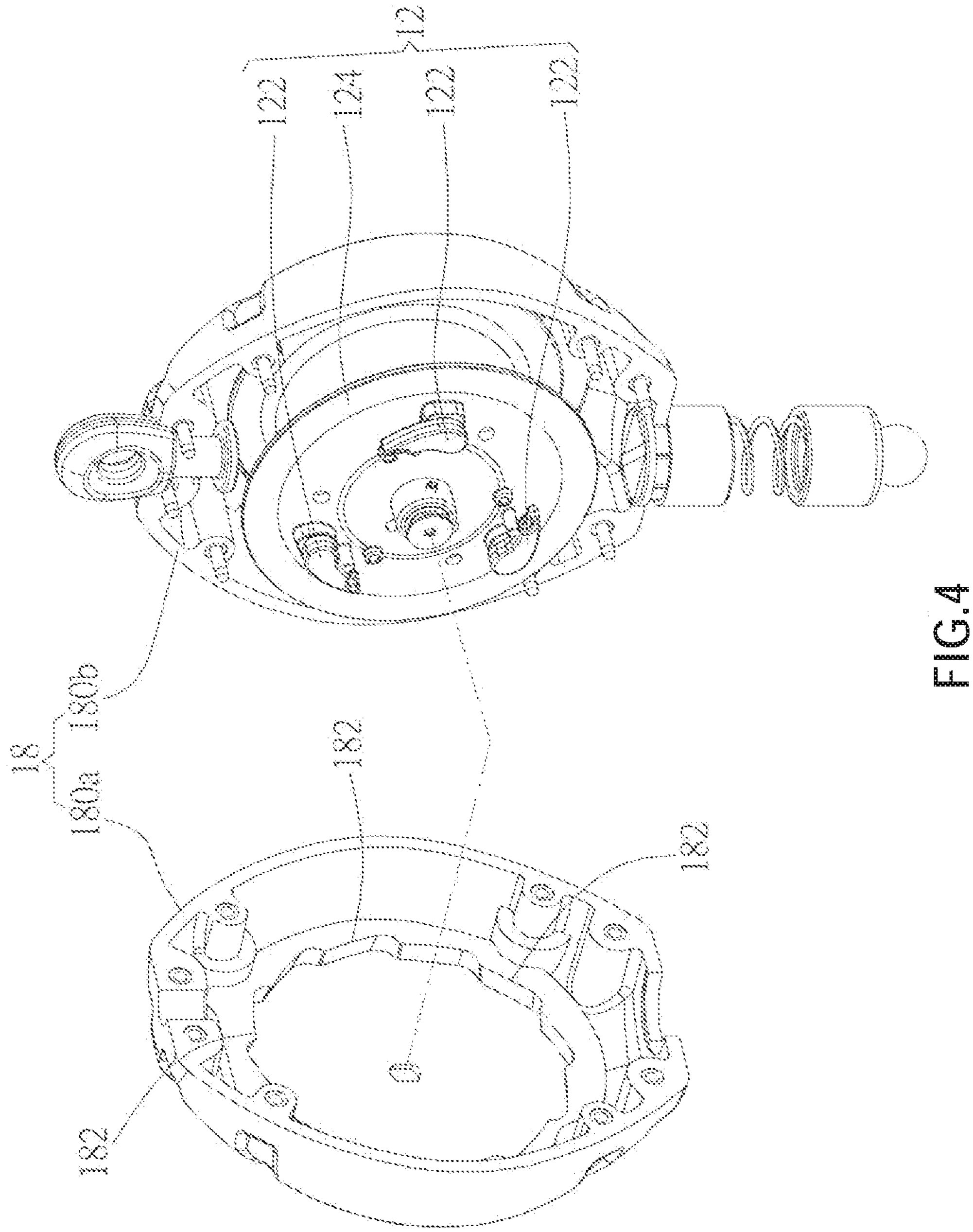
FIG. 4 is an exploded view of a housing of the fall protection device of the preferred embodiment.

As illustrated in FIG. 4, the rope based fall protection device 1 includes a housing 18 for accommodating components such as the brake unit 12, the rotation unit 14, the cover plate 16, the rope 20, and the retaining ring 30. In the current embodiment, the housing 18 includes a first assembly 180*a* and a second assembly 180*b*. The first assembly 180*a* and the second assembly 180*b* are coupled to each other and form an accommodating space. The components such as the brake unit 12, the rotation unit 14, the cover plate 16, the rope 20, and the retaining ring 30 can be disposed in the accommodating space formed by the first assembly 180*a* and the second assembly 180*b*.

In FIG. 4, the first assembly 180*a* of the housing 18 has a plurality of stopping parts 182 located in an inner surface of the first assembly 180*a* toward the brake unit 12. The stopping parts 182 is adapted to abut the brake member 122 of the brake unit 12 to stop the brake unit 12 from rotating. More specifically, when the free end of the rope 20 is pulled by a strong external force to have the rope 20 which is wound around the rotation unit 14 to be released in the direction away from the rotation unit 14, the rotation of the rotation unit 14 drives the brake member 122 of the brake unit 12 to pivot away from the axis and abut against the stopper parts 182 of the first assembly 180*a* to stop the brake unit 12 from rotating. At the time, the friction plate 40 still rotates in the same direction as the rotation unit 14, but the brake unit 12 does not rotate in the same direction as the rotation unit 14 any longer, causing the friction surface 126 of the brake unit 12 and the friction pad 44 of the friction plate 40 to rub against each other, thereby slowing the rotation speed of the rotation unit 14.

It can be seen that when the user fastened by the free end of the rope 20 accidentally falls from heights, the pulling force generated by the user's free fall causes the retaining ring 30 to break to release the rope section of the rope 20, so that the rotation unit 14 rotates and simultaneously drives the brake unit 12 to rotate to slow down the rotation speed of the rotation unit 14, thereby preventing the user from being injured by the short free fall and the pulling force caused by the rope 20.

Figure 3:
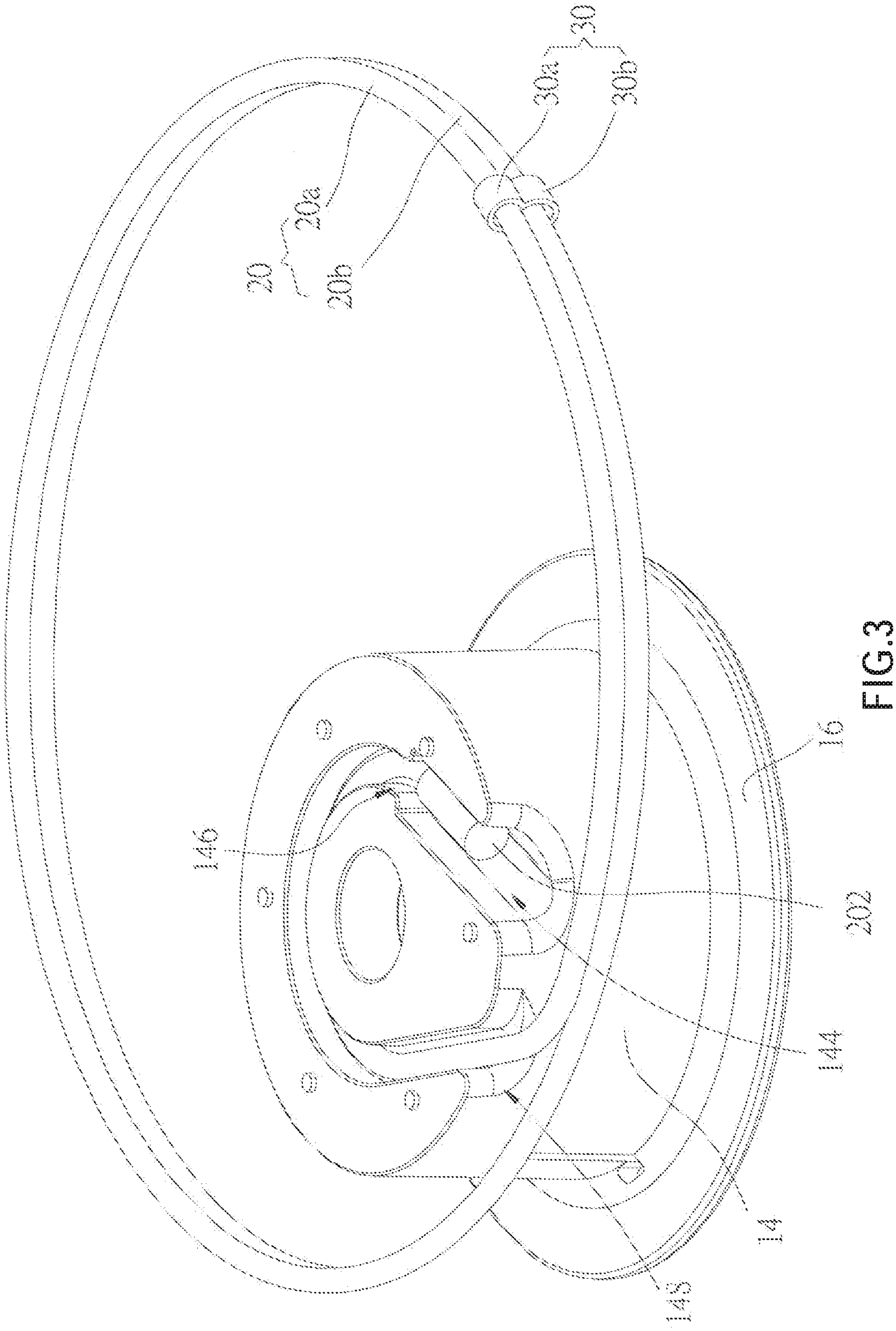
FIG. 3 is a perspective view of the rotation disc of the fall protection device of the preferred embodiment, wherein the brake disc of the fall protection device is omitted.

As illustrated in FIG. 3, the rope 20 has a rope head 202 at the first end of the rope 20. The rotation unit 14 has a fixed groove 144 and the rope head 202 is disposed in the fixed groove 144. A section of the rope 20 adjacent to the rope head 202 passes through a connecting groove 146 and the rope 20 passes through a through opening 148. Then, at least the first rope loop 20*a* and the second rope loop 20*b* of the rope 20 are wound around the rotation unit 14.

Figure 5:
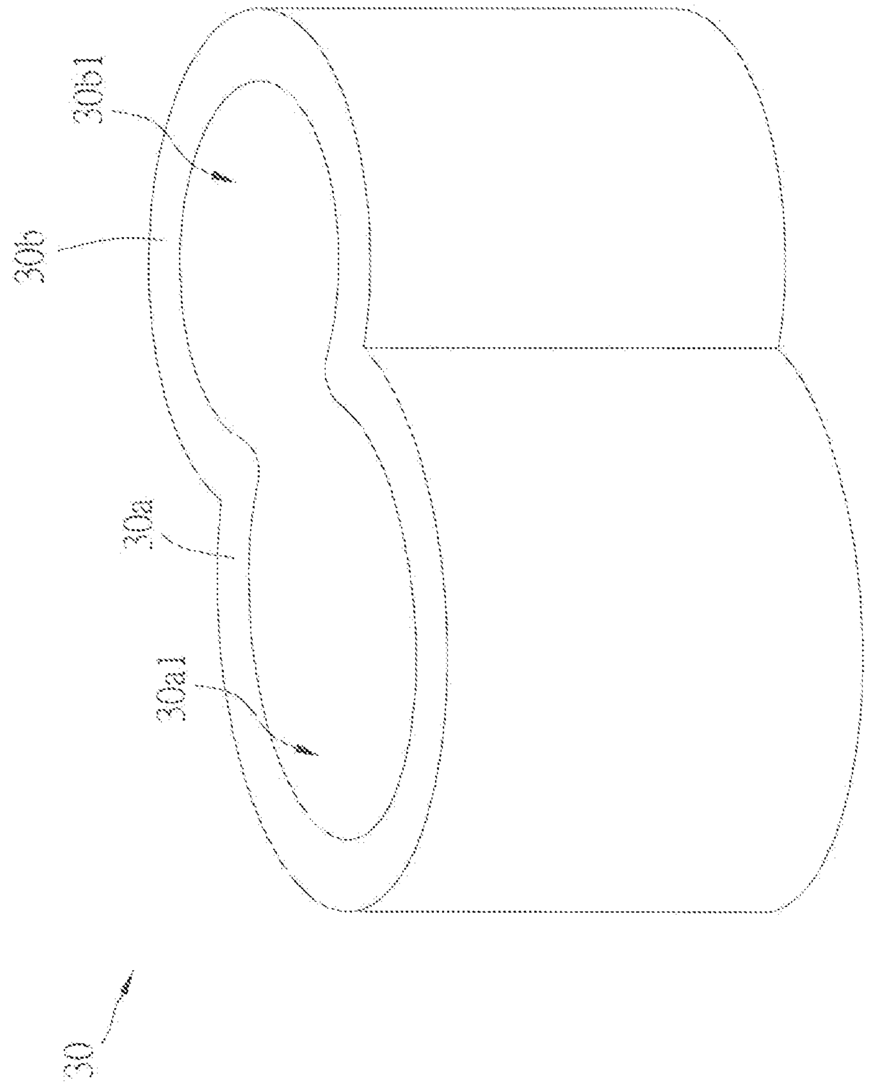
FIG. 5 is a perspective view of a retaining ring of the rotation disc of the fall protection device of the preferred embodiment.
Figure 6:
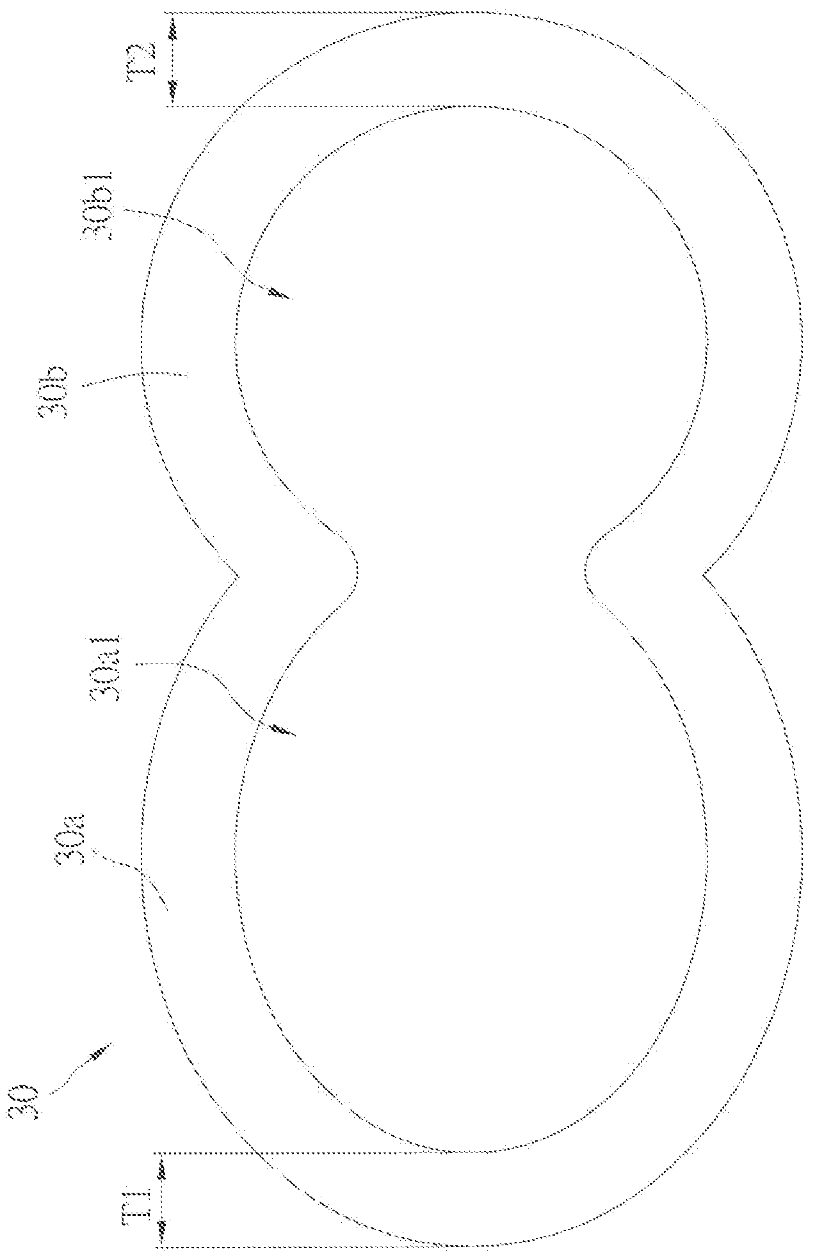
FIG. 6 is a top view of the retaining ring in FIG. 5.
Figure 7:
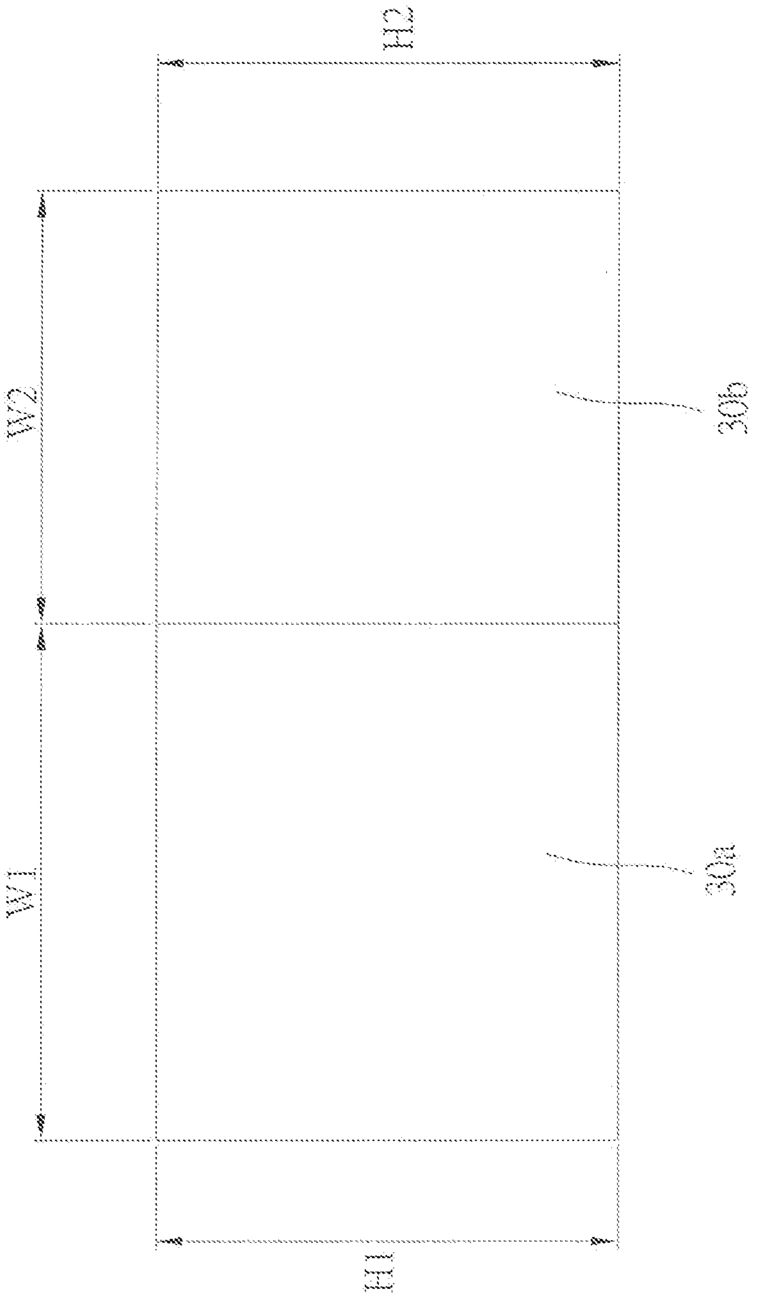
FIG. 7 is a side view of the retaining ring in FIG. 5.

As illustrated in FIG. 5 and FIG. 6, the first retaining portion 30*a* of the retaining ring 30 has a through hole 30*a*1 and the second retaining portion 30*b* has a through hole 30*b*1. The through hole 30*a*1 of the first retaining portion 30*a* communicates with the through hole 30*b*1 of the second retaining portion 30*b*. In the current embodiment, referring to FIG. 6, a cross-sectional area of the through hole 30*a*1 of the first retaining portion 30*a* of the retaining ring 30 is larger than that of the through hole 30*b*1 of the second retaining portion 30*b*. Besides, as illustrated in FIG. 7, the first retaining portion 30*a* of the retaining ring 30 has a first width W1 and the second retaining portion 30*b* has a second width W2. The first width W1 is greater than the second width W2, but not limited thereto. In practice, the first width W1 and the second width W2 can be adjusted as needed, that is, the first width W1 can be less than or equal to the second width W2.

As illustrated in FIG. 6, the first retaining portion 30*a* of the retaining ring 30 has a first thickness T1 and the second retaining portion 30*b* has a second thickness T2. The first thickness T1 is equal to the second thickness T2, but not limited thereto. In practice, the first thickness T1 and the second thickness T2 can be adjusted as needed, that is, the first thickness T1 and the second thickness T2 are not necessarily the same. The first thickness T1 and the second thickness T2 may also be different, for example, the first thickness T1 is greater than or less than the second thickness T2.

In addition, as illustrated in FIG. 7, the first retaining portion 30*a* of the retaining ring 30 has a first height H1 and the second retaining portion 30*b* has a second height H2. the first height H1 is equal to the second height H2, but not limited thereto. In practice, the first height H1 and the second height H2 can be adjusted as needed, that is, the first height H1 and the second height H2 are not necessarily the same. The first height H1 and the second height H2 may also be different, for example, the first height H1 is greater than or less than the second height H2.

With the design of the present invention, the retaining ring of the rope based fall protection device is sleeved on the rope, such that the rope forms the rope section which has the fixed length between the second retaining portion and the first end is wound around the rotation unit. If the worker falls accidentally from heights, the free end of the rope fastened to the worker is pulled by the external force, the retaining ring is broken due to the external force and the rope section of the rope is released. By releasing the rope section of the rope, the rotation unit rotates and simultaneously drives the brake unit to rotate so as to slow down the rotation of the rotation unit and prevent the worker from being injured by the short free fall and the pulling force caused by the rope.

It must be pointed out that the embodiments described above are only some embodiments of the present invention. All equivalent structures which employ the concepts disclosed in this specification and the appended claims should fall within the scope of the present invention.

What is claimed is:

1. A rope based fall protection device, comprising a rotation unit, a brake unit, a stopping part, a friction unit, and a rope, wherein the stopping part is fixed in a housing of the rope based fall protection device; the friction unit is disposed between the rotation unit and the brake unit and is connected to one of the rotation unit and the brake unit, and is movable relative to the other one of the rotation unit and the brake unit; the rope is wound around the rotation unit; the brake unit is connected to the rotation unit and is configured to restrict rotation of the rotation unit; a first end of the rope is connected to the rotation unit, and rotates as the rotation unit rotates so that the rope is wound around the rotation unit; a second end of the rope is a free end; the rope based fall protection device is characterized in that:

the rope from the first end to the second end at least sequentially including a plurality of third rope loops, a first rope loop, and a second rope loop that are wound around the rotation unit, wherein the first rope loop is disposed between the plurality of the third rope loops and the second rope loop;

a retaining ring includes a first retaining portion and a second retaining portion adjacent to each other, wherein the first retaining portion is sleeved on the first rope loop and the second retaining portion is sleeved on the second rope loop, such that the rope forms a rope section which has a fixed length between the second retaining portion and the first end and wherein the rope section is wound around the rotation unit; the retaining ring fits around the first rope loop and the second rope loop wherein the retaining ring is movably and indirectly fixed to the rotation unit only via said rope;

when the free end of the rope is pulled by an external force to release the rope wound around the rotation unit in a direction away from the rotation unit, the retaining ring is broken to release the rope section of the rope; by releasing the rope section of the rope, the rotation unit rotates and simultaneously drives the brake unit to rotate, causing the brake unit to abut against the stopping part to stop rotating, and then the rotation unit rotates relative to the brake unit, the friction unit rubs against one of the rotation unit and the brake unit to slow down a rotational speed of the rotation unit;

the external force is greater than or equal to a pulling force generated by a user's free fall.

2. The rope based fall protection device of claim 1, wherein when the retaining ring is broken, the first retaining portion and the second retaining portion of the retaining ring are separated from each other to release the rope section of the rope.

3. The rope based fall protection device of claim 1, wherein when the retaining ring is broken, at least one of the first retaining portion and the second retaining portion of the retaining ring is broken, causing the rope disengaged from at least one of the first retaining portion and the second retaining portion to release the rope section of the rope.

4. The rope based fall protection device of claim 1, wherein at least one of the first retaining portion and the second retaining portion of the retaining ring has a slit; when the retaining ring is broken, the rope is disengaged from at least one of the first retaining portion and the second retaining portion through the slit to release the rope section of the rope.

5. The rope based fall protection device of claim 1, wherein the first retaining portion of the retaining ring has a first thickness, and the second retaining portion thereof has a second thickness; the first thickness is equal to the second thickness.

6. The rope based fall protection device of claim 1, wherein the first retaining portion of the retaining ring has a first width, and the second retaining portion thereof has a second width; the first width is different from the second width.

7. The rope based fall protection device of claim 1, wherein the first retaining portion of the retaining ring has a first height, and the second retaining portion thereof has a second height; the first height is equal to the second height.

8. The rope based fall protection device of claim 1, wherein a through hole of the first retaining portion of the retaining ring communicates with a through hole of the second retaining portion of the retaining ring.

9. The rope based fall protection device of claim 1, wherein a cross-sectional area of a through hole of the first retaining portion of the retaining ring is larger than a cross-sectional area of a through hole of the second retaining portion of the retaining ring.

10. The rope based fall protection device of claim 1, wherein the rope has a rope head at the first end of the rope; the rotation unit has a fixed groove, and the rope head is disposed in the fixed groove.

11. The rope based fall protection device of claim 1, wherein the retaining ring is configured to be spaced apart from the rotation unit when the first rope loop and the second rope loop are sleeved within the retaining ring.

* * * * *